United States Patent Office 2,926,391
Patented Mar. 1, 1960

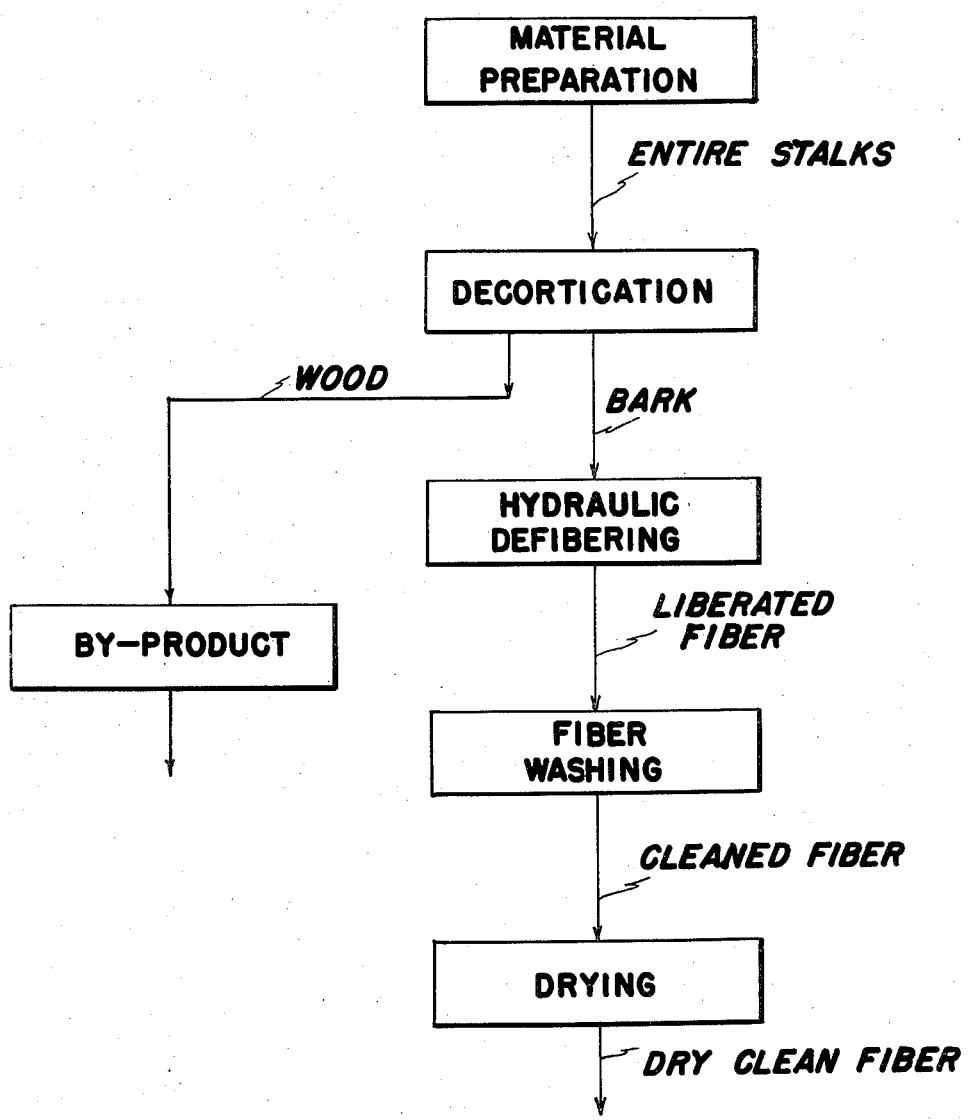

2,926,391

METHOD OF PROCESSING VEGETABLE FIBERS

Josef Haas, Austin, Tex., assignor to International Fiber Development Corporation, Austin, Tex., a corporation of Texas Application April 23, 1954, Serial No. 425,167

3 Claims. (Cl. 19—7)

The present invention relates to a process for the decortication and defibering of bast materials of barks of the plant species Malvaceae. More specifically, this invention relates to the process of mechanical decortication, hydraulic defibering, washing and drying of bast fibers of the plant species of the Hibiscus family of Malvaceae and the invention is particularly adapted to treatment of the plant species: *Sida rhombifolia*, or "escobilla," Corchorus or "jute."

The process of course, may be employed in the treatment of other and similar fiber bearing plants having the characteristics of jute, escobilla and plants of similar structure. In the species of the family of Malvaceae the fibers generally are carried in the inner region of the soft outer stem tissues of the stalk, immediately outside the wooden stem. This is unlike the fleshy species of "maguey" and "sisal" which also bear fibers. Leaf-fiber plants cannot be decorticated. They may only be defibered and cleaned and then the problems inherent in their extraction differ widely from those inherent in the process at hand. Bast fibers may be used for textile purposes, for it has been found that the bark of the stalk yields long strand fibers of a very delicate and flaxen nature, yet of great strength. Moreover, this Malvaceae fiber contains higher content of cellulose than the well known jute fibers, and additionally the fiber contains less lignin. In the stalks of the plants of the Malvaceae family, the fibers tend to occur in more or less definite layers parallel to the surface of the stem of the stalk. For this reason, the removal of the fibers from the stalk presents interesting problems not the least of which is the problem arising from the radial thickness of the fiber containing phloem of the bark.

Most of known and similar systems are adapted to process fresh stalks of fiber bearing plants and few of the systems are designed to process stalks of plants bearing soft fibers. Great quantities of fiber are lost through the known processes because of the necessity for processing while the stalks are relatively fresh from harvest. Moreover, known decorticating and defibering devices tend to break down the constituency of fibers thereby to render large quantities of said fibers of little or no use commercially. In the processing of Kenaf-fiber, for instance, it is known that relatively fresh stalks must be processed otherwise fermentation quickly decomposes the fiber. In the present process, however, either freshly harvested plants or those which have been cut, matured and allowed to dry in the field may be retted and processed during nearly the entire year, without risk of injury to the fibers. Production-capacity inherent in the present process is therefore superior to any that is known in the art.

Chemical extraction of the fiber from the bark is common, however, it is expensive and certainly not adapted to mass production.

The present invention is therefore adapted not only to decorticate stalks, i.e. to remove the bark from the stalk, but also to defiber the bark, i.e. to extract the fiber from its bark. The process is adapted to defiber bark such as is found in "jute" and "sidas" plants having short fibers.

In general the process may be defined as a combined decorticating, defibering and washing and drying system for stalks of plants bearing bast fiber materials and which have wooden stems. In practice, the invention encompasses preparation of the stalks by immersion in retting fluids. As indicated, stalks may be freshly cut from the field and processed or may be dried before processing, thereby permitting employment of the system well after the harvesting of the stalks may be effected. Decortication of the retted stalks of the bast fiber bearing plant follows retting and generally includes a wringing or partial twisting of the bark from the stem of the stalks simultaneously while retaining the stem against lateral movement and of subsequently expressing a fluid stream against the wrung bark to lay the bark aside from the stem and to direct the bark toward decorticating means; of removing the bark from stems by mechanically pulling the same from the stem. The system further contemplates continuous steps in the defibering of the decorticated bark as by expressing fluids under high pressure against the bark as it is passed over a confined restraining surface. The system further comprises radially washing a defibered bunch, and drying the same by wringing and other means.

One object of the invention is as follows: To provide a process for the treatment of bast fiber plants to decorticate the same and to defiber decorticated bark thereof, the process being adapted to the treatment of either fresh cut or matured and dried stalks.

Another object of the invention is to provide a system for the production of soft fibers from bast fiber bearing plants wherein there is no lost fiber nor damage to decorticated fiber bearing materials during the process, the system being specifically adapted to decorticate and defiber the thinnest branches of stalks of fiber bearing plants.

Yet another object of the invention is to provide a combined decorticating, defibering and washing system for fiber bearing plants in which the defibering is effected hydraulically without damage to the fibers.

Yet another object of the invention is to provide novel means for decorticating bark of bast fiber bearing plants through combination of mechanical and expressed fluid means.

Yet another object of the invention is to provide a combined decorticating, defibering and washing system for fiber bearing plants whereby the fibers rendered are of greater length than fibers rendered by known devices and are, therefore, especially adaptable for weaving into coarse textile products such as "gunny" sack and rope.

In the drawing, the single figure is a flow chart showing a sequence of the steps of the process.

In the process, harvest stalks of bast fiber bearing plants whether fresh or dried are transported by trucks from camp or field to especially constructed basins which are closed and flooded with pure water and the stalks thereafter exposed, in accordance with current practice, to the retting process which normally lasts from ten to twelve days. Under the present system, although bark is completely softened and loosened from the wooden stalk by the retting process, a very thin membrane actually still joins the bark to the stem of the stalk, thereby permitting the stalks to be handled by operators without difficulty.

As indicated, decorticating a stalk is removing the bark from the stalk. In the present invention, retted stalks may be placed upon a conveyance and passed to decorticating means. In combination, these means include apparatus for retaining the stalk in a relatively fixed position while wringing or twisting the bark partially therefrom. In my copending application Serial No. 425,166 entitled Apparatus for Processing of Vegetable Fibers and filed April 23, 1954, I have defined a preferred mechanical means for retaining the stalks against lateral displacement while twisting the bark. In essence, I pass stalks which are well automatically spaced through two vertically opposed and horizontally extending stalk retaining rollers. In line with these horizontally extending rollers I provide partial decorticating rollers. Acting in concert with the retaining rollers, the partial decorticating rollers wring or twist the bark from the stem of the stalk, thereby breaking entirely any remaining membraneous bond between the bark and the stem, thus partially decorticating the bark from the stem of the stalk. This partial decorticating is preparatory to final decortication. By this step, the bark containing the fibers is partially set aside from the stem so that decorticating rollers may thereafter grasp a portion or portions of the bark to finally decorticate the stalk.

The partially decorticated stalk is sequentially transported from the twisting rollers to a final decorticating station. At this point, expressed fluid may be directed against each stalk to force the partially decorticated bark containing the fiber away from the stem and toward the decorticating rollers. Through counter-rotary friction engaging action of decorticating rollers, the bark containing the fibers is stripped completely from the stem. By this stripping action the stem which has been stripped of its bark is thrust forward where it may be pulverized as a by-product of the fiber.

It will be appreciated that the decorticating may be effected with or without initial and partial decortication defined above and used in combination with the retaining system. Thus, preparatory to introducing retted stalks into the system, the operator may scutch and end portion of a stalk, as by brushing, pass the partially scutched stalk across the path containing the decorticating rollers thereby enabling stripping off the bark containing the bast fibers from the stalks. The stripped stem is thus thrust outwardly and the bark pulled downwardly and away from the decorticators to conveyors for further treatment.

As a modification, the decorticating rollers may be provided with a foraminous exterior outer cover. Connecting a vacuum system to the decorticating rollers, the effects derived from the mechanical counter rotation and from the evacuation of the atmosphere in the general area thereabout will draw in the partially decorticated bark from the path of movement of the stalk to the counter rotating decorticating roller elements.

Thus all bark may be perfectly cleanly removed from wooden stems regardless of the presence of branches, forks or bows or other defects in the stalk itself.

In continuity with the decortication, there follows the defibering of the decorticated bark. The decorticated bark may now be automatically transported from the decorticators to a conveyor where preferably one bunch of decorticated bark is grasped and conveyed through a defibering area, which includes a target channel. While moving by conveyance, the bark is subjected to expressed fluid sprays and by the retention of the bark within a channel toward which the sprays are directed, there is by impact a physical separation of the bark from the fibers which form the base thereof, and of the fibers one from another. Preferred hydraulic means for defibering is defined in my copending patent application which I have identified above. In operation, the decorticated bark is passed through a plurality of target channels disposed longitudinally in-line. As the bark is passed from one channel to another, the fibers are progressively cleansed of the bark, adherent gums and impurities. Canalizing the decorticated bark for purposes of expressing hydraulic fluids thereagainst serves to restrict the area in which the hydraulic fluids can effectively cleanse the fibers while defibering.

Subsequent to defibering, washing of adherent gums and impurities from the newly freed fibers is effected as by passing the fibers through a system of radially directed jets of cleaning fluid. Other washing means than that shown in my copending application may be employed, however, the arrangement there shown is most satisfactory. Sequentially, the fibers are conveyed to wringers to express the washing fluids therefrom and to dry the fibers.

Whereas I have defined my invention with reference to specific apparatus, it is not my intention to be limited to the apparatus or specific mode of operation which I have described above for purposes of illustration. Rather, the scope of my invention, it being obvious that other and equivalent devices and steps of operation may be employed, shall be defined only as per the claims appended hereto, in which I claim:

1. A method of extracting bast fibers from bark of stalks of plants of the Malvaceae species which comprises wringing the bark layers from the stalk cores while restraining the stalk cores from twisting for selective physical ing the bark layers from the stalk cores, and defibering by thereafter hydraulically impacting the bark layers against a restraining surface to separate the fibrous elements therein.

2. A method of extracting bast fibers from bark of stalks of plants of the Malvaceae species which comprises wringing the bark layers from the stalk cores while restraining the stalk cores from twisting selective physical destruction of the bond between said bark layers and the stalk cores, sequentially peeling the bark layers from the stalk cores, and defibering the bark layers with hydraulic impaction against a confined restraining surface to separate the fibrous elements therein.

3. The method of extracting bast fibers from bark of stalks of plants of the Malvaceae species including the steps of first mechanically wringing the bark from stalks while holding the stalks against turning, next peeling the wrung bark from the stalk by initially and progressively impacting the stalk with a high pressure fluid and sequentially mechanically pulling the fiber containing bark from the stalk, thirdly of defibering by hydraulically impacting the bark layers successively against confined and restraining surfaces.

References Cited in the file of this patent

UNITED STATES PATENTS

| Number | Name | Date |
|---|---|---|
| 9,650 | Pownall | Apr. 5, 1853 |
| 279,435 | Roberts | June 12, 1883 |
| 635,345 | Packer | Oct. 24, 1899 |
| 884,401 | Matthews | Apr. 24, 1908 |
| 1,598,094 | Lowry | Aug. 31, 1926 |
| 1,964,633 | Haynes | June 26, 1934 |
| 1,983,454 | Haynes | Dec. 4, 1934 |

FOREIGN PATENTS

| Number | Country | Date |
|---|---|---|
| 692,739 | Germany | June 26, 1940 |